D. Harwood.
Jaw Trap.
N° 92,823.　　　　　Patented Jul. 20, 1869.
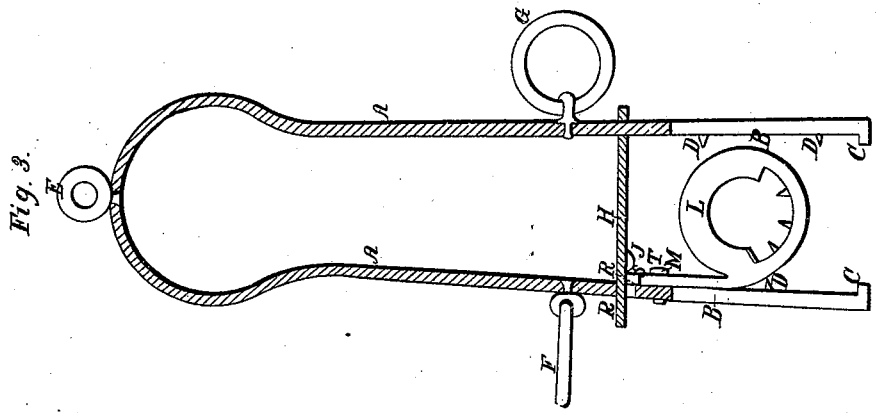
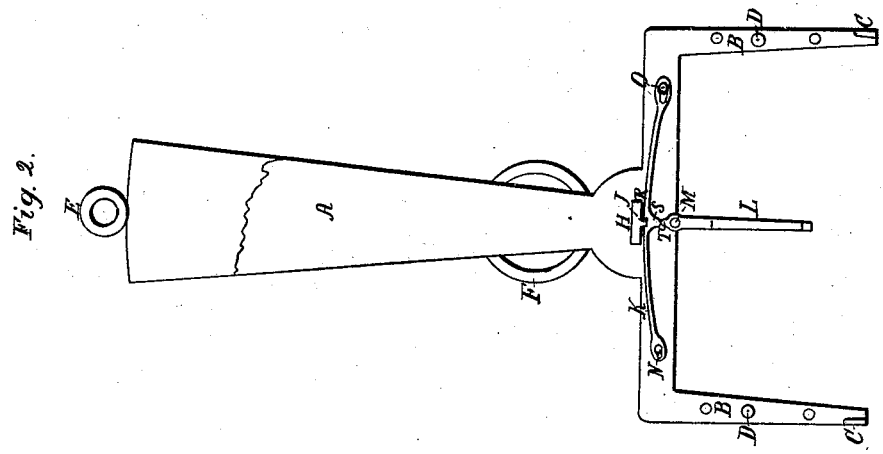
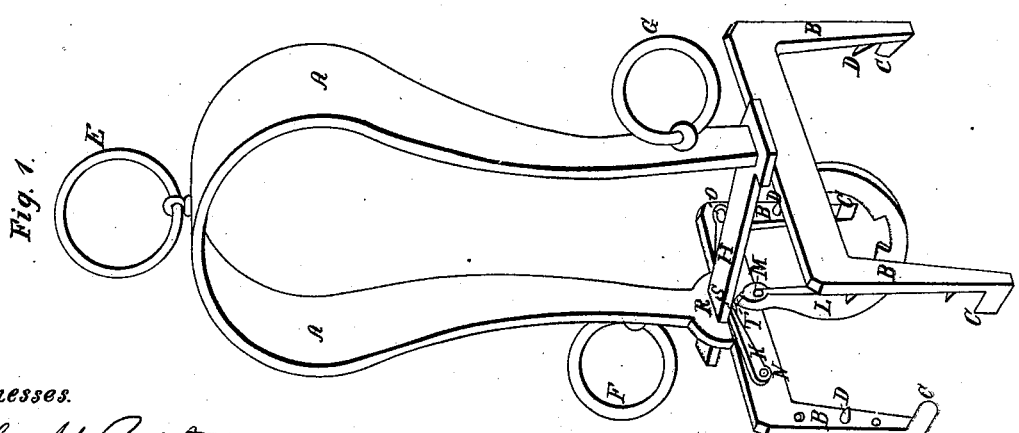
Witnesses.
John H. Redstone
Albert E. Redstone
Inventor
Daniel Harwood

United States Patent Office.

DANIEL HARWOOD, OF DUTCH FLAT, CALIFORNIA, ASSIGNOR TO HIMSELF AND SETH WHITE, OF SAME PLACE.

Letters Patent No. 92,823, dated July 20, 1869.

IMPROVED ANIMAL-TRAP.

The Schedule referred to in these Letters Patent and making part of the same.

*To all whom it may concern:*

Be it known that I, DANIEL HARWOOD, of Dutch Flat, in the county of Placer, and State of California, have invented a certain new and improved Animal-Trap, of which the following is a full and exact description, reference being had to the accompanying drawing, and the letters of reference marked thereon.

Figure 1 is a perspective,
Figure 2, a longitudinal, and
Figure 3, a transverse section, in which A is the main-spring.
B, the jaws.
C, cutters or blades.
D, teeth.
E is the ring for attaching the chain.
F is a ring for the foot, and
G, a ring for the hand in setting the trap.
H is a sliding bar, operating through the mortise R.

Attached to the under part of the bar H is the catch or projection J, which stops against the spring K.

The bait-pan L is pivoted at M.

The spring K is attached at N and at the slot O, which allows the spring K to operate, raising up the bar H, to receive the shoulder or projection J.

Upon the spring K is the projection S, which operates, in connection with the corresponding projection T, upon the end of the bait-pan lever L, for the purpose of operating the spring K, in holding or discharging the bar H.

The following is the operation of the trap:

The foot being placed in the ring F, and the hand in the ring G, the jaws B are drawn back, withdrawing the slide H until the shoulder or projection J passes the spring K, which rises against the slide H, to receive the bar H.

The bait-pan L is then brought in line, so that the projection upon the same is directly under the projection upon the spring K, thereby holding the bar H, which holds the jaws of the trap apart when the trap is set. The trap is then set so that the spring A stands perpendicularly.

When set for gophers or common ground-moles, it is placed so that the bait-pan lies in the centre of the hole, and the jaws B stand each side of the hole. The top is then covered, to exclude the light. The mole then passing in at either end, comes in contact with the bait-pan L, which, being moved either way, moves off the projection upon the spring K, releasing the same, when the inclined projection or shoulder J forces the spring K down, freeing the bar H, and allowing it to pass through the mortise R, and the jaws B to fly together, catching the mole.

When the trap is constructed for catching larger animals, as foxes, wolves, bears, &c., the trap is placed longitudinally between two logs, notched to receive the jaws, in order to conceal them from the animal.

It will be seen that the jaws are provided with blades, C, for cutting the throat of animals whose flesh is good for food.

The staple E has a chain attached, and made fast to the limb, for the purpose of lifting the animal, should it attempt to run with the trap.

The blades C may be so placed as to cut the throat of the animal, severing the large veins of the neck, thereby killing it.

The advantages of this trap are seen in the facility with which it is set, while the ordinary wear does not affect the operation of the same. The size or power of the trap does not materially affect the facility with which the triggers are held or discharged.

The lightness and compactness of the trap, in proportion to the weight and power of the same, is another remarkable feature; also, the preserving of the flesh of such animals as are good for food, is of considerable importance, while the durability of the setting-arrangement is also of much importance.

I claim the combination of the spring A, the jaws B B, the blades C C, when the trap is operated by the sliding bar H, inclined projection J, and catch-spring K and its projections S, held by the projection T on the bait-pan, substantially as and for the purpose set forth.

DANIEL HARWOOD.

Witnesses:
JOHN H. REDSTONE,
ALBERT E. REDSTONE.